United States Patent

Yeransian

[15] 3,644,122

[45] Feb. 22, 1972

[54] ALKALINE TREATMENT OF COFFEE

[72] Inventor: James A. Yeransian, Pearl River, N.Y.

[73] Assignee: General Foods Corporation, White Plains, N.Y.

[22] Filed: Sept. 25, 1969

[21] Appl. No.: 861,140

[52] U.S. Cl. .................................................................99/71
[51] Int. Cl. ..............................................................A23f 1/08
[58] Field of Search.......................................................99/71

[56] References Cited

UNITED STATES PATENTS

| | | | |
|---|---|---|---|
| 2,036,345 | 4/1936 | Merkel | 99/71 |
| 2,712,501 | 7/1955 | Hale et al. | 99/71 |
| 2,573,406 | 10/1951 | Clough et al. | 99/71 |
| 3,155,523 | 11/1964 | Reich | 99/71 |

OTHER PUBLICATIONS

Sivetz, Coffee Processing Technology, Vol. 2, 1963 pages 240–242.

Primary Examiner—Frank W. Lutter
Assistant Examiner—William L. Mentlik
Attorney—Gerald E. Jacobs, Bruno P. Struzzi and Thomas V. Sullivan

[57] ABSTRACT

Ground, roasted coffee or spent coffee grounds are treated with an alkaline material to provide coffee extract in increased yield and with improved color.

8 Claims, No Drawings

ALKALINE TREATMENT OF COFFEE

BACKGROUND OF THE INVENTION

This invention pertains to alkaline treatment of coffee extract and roasted and ground coffee being extracted to produce a soluble coffee with darker color and/or to obtain increased percolation yields.

Ground roasted coffee is generally extracted with water at a temperature in the range of from about 50° C. to about 230° C. The extraction may be carried out in one or more extraction columns in series. For economic considerations, it is desirable to maximize the yield of soluble solids. It is also desirable to obtain a dark colored product.

The preparation of instant or soluble coffee starts with ground, roasted coffee which is treated with water until from about 20 percent by weight to about 35 percent by weight of the fresh roasted bean is extracted as water-soluble solids. It has been known to carry out this process in the presence of sulfuric acid or phosphoric acid. The acid-treated coffee extract is subsequently neutralized, care being taken to insure that the pH does not exceed 7.0 during or subsequent to neutralization. Prior extraction techniques, however, fail to maximize the yield of soluble coffee solids, or to obtain a product as dark in color as possible.

SUMMARY OF THE INVENTION

It has now been found that an increased yield of soluble solids and a darker colored product are obtained by contacting a coffee material with an alkaline material. The coffee material may be ground roasted coffee which is contacted with an alkaline material during extraction or prior to drying the coffee extract, or the coffee material may be spent or extracted coffee grounds which are contacted with an alkaline material. In the case of ground roasted coffee, an alkaline material may be added to the feed water used to extract the ground coffee, or to the final extraction column, or to any intermediate point. The coffee extract may be contacted with alkaline material just prior to drying. In the case of spent coffee grounds, the alkaline material may be added to spent coffee grounds or to blow down liquor.

The invention is directed to a method for treating a coffee material which comprises contacting a coffee material with an alkaline material, the contacting taking place in an aqueous medium at a temperature above about 50° C., the concentration of alkaline material being at least about 0.01 N.

The invention is directed to a method for treating a coffee material which comprises contacting a coffee material with an alkaline material, the contacting taking place in an aqueous medium at a temperature of at least about 85° C., the concentration of alkaline material being at least about 0.025 N.

The invention is directed to a method for treating a coffee material with an alkaline material, the contacting taking place in an aqueous medium at a temperature in the range of from above about 50° C. to about 275° C., the concentration of alkaline material being at least about 0.01 N.

The invention is directed to a method for treating a coffee material which comprises contacting a coffee material with an alkaline material, the contacting taking place in an aqueous medium at a temperature of from about 85° C. to about 200° C., the concentration of alkaline material being at least about 0.025 N.

The invention is directed to a method for treating a coffee material which comprises contacting a coffee material with an alkaline material, the contacting taking place in an aqueous medium at a temperature of from about 150° C. to about 180° C., the concentration of alkaline material being at least about 0.025 N.

The invention is directed to a method for treating a coffee material which comprises contacting a coffee material with ammonia, or the hydroxides, carbonates or the bicarbonates of the alkali metals, the alkaline earth metals, or mixtures thereof, in an aqueous medium at a temperature in the range of from above about 50° C. to about 275° C., the concentration of alkaline material being at least about 0.01 N.

The invention is directed to a method for treating a coffee material which comprises contacting a coffee material with ammonia, the contacting taking place in an aqueous medium at a temperature above about 50° C., the concentration of ammonia being at least about 0.025 N.

The invention is directed to a soluble extract of coffee obtained by treating a coffee material with an aqueous solution, the concentration of alkali being at least about 0.01 N, the extract having a high and low molecular weight fraction, the high molecular weight fraction having a molecular weight as determined by the Sephadex procedure of about 50,000 or higher acid hydrolysis of the purified high molecular weight fraction, followed by treatment with an ion exchange resin yields a first component comprising amino acids, a second component comprising neutral compounds, and a third component comprising organic acids. The low molecular weight fraction is similar to the organic acids component of the high molecular weight fraction.

DETAILED DESCRIPTION

The alkaline material may be ammonia, or the hydroxides, carbonates or bicarbonates of the alkali metals, or of the alkaline earth metals, or mixtures thereof. In addition, two or more alkaline materials may be employed sequentially.

The treatment of a coffee material by an alkaline material is affected by the particular alkaline material chosen, its concentration, the temperature at which the treatment is carried out and, the length of time for which the treatment is continued. The conditions which maximize yield of soluble solids are not necessarily the same as those which yield the darkest color.

The yield of soluble solids depends mainly upon temperature and concentration of base. As a practical matter, the solution of alkaline material should be at least about 0.01 N and the temperature should be above about 50° C. Preferably, the solution of alkaline material should be at least about 0.025 N and the temperature should be at least about 85° C. More highly concentrated alkaline solutions may, of course, be used. In fact, the amount of alkaline material may exceed the amount of coffee material. The yield of soluble solids increases as the concentration of alkaline material increases. At lower concentrations of alkaline material (up to about 0.002 parts by weight), the yield is more dependent upon temperature than time of extraction. At higher concentrations of alkaline material, time and temperature are of less influence than concentration. The extraction time may vary from a few minutes to several hours. Generally, however, the treatment with an alkaline material according to the present invention will last at least about 10 minutes.

The coffee material may be treated with an alkaline material according to the present invention at temperatures of from about 50° C. up to about 275° C. Preferably, however, the temperature is from about 85° C. to about 200° C. Most preferably, the temperature is from about 150° C. to about 180° C.

The alkaline material may be added as a solid, or as a solution or as a slurry. Ammonia is a preferred alkaline material as it may be removed by boiling after treating the coffee, leaving no residual cations. When a cation-containing alkaline material is employed, excess cations may be removed by any conventional method, for example, by treatment with an ion exchange resin, by acid precipitation, by alcohol precipitation, or by dialysis of the soluble extract.

The use of an alkaline material to treat coffee material provides an increased yield of soluble coffee product as well as a darker product. The extract obtained by treating the coffee material with ammonia, or ammonium hydroxide, however, is noticeably darker than that obtained by treatment with a strong base, such as, for example, sodium hydroxide. Extraction with ammonia gives a product having a color about 2 or 3 times as great as is obtained with a strong base. For this reason, and because it can be removed simply by heating, ammonia is a preferred alkaline material.

Better results are obtained in some cases by treating the spent coffee grounds sequentially with a plurality of alkaline materials, for example, first with ammonia and then with sodium hydroxide or, alternatively, first with sodium hydroxide and then with ammonia.

The product resulting from the alkaline treatment is a dark colored extract which may be treated in numerous ways. For example, it may be filtered, neutralized, and treated with an ion exchange material to yield a dark colored liquid extract which may be added to the liquid extract resulting from the initial extraction of the roasted coffee.

The extract resulting from the alkaline treatment of the spent grounds may be dried to yield water soluble, caramel colored solids which are relatively bland tasting and can be blended with the soluble coffee previously obtained in percolation.

The extract resulting from the alkaline treated spent coffee grounds may be neutralized, and treated to remove cations if the alkaline material used is not ammonia, to obtain an extract free of materials formed from the fat fraction of the coffee. This extract may be added to the liquid extract resulting from the initial extraction of the roasted coffee.

By adding coffee flavor and aroma to the dried extract resulting from the alkaline treatment of the spent grounds, a reconstitutible coffee drink powder is obtained.

The alkaline treatment of a coffee material according to the present invention produces a product which is distinctly different from that obtained by aqueous extraction or aqueous acidic extraction of coffee material. The product obtained by treating a coffee material with an alkaline material has a high molecular weight fraction and a low molecular weight fraction. The high molecular weight fraction has a molecular weight determined by the Sephadex procedure of about 50,000 or higher. Acid hydrolysis of the purified high molecular weight fraction followed by treatment with an ion exchange resin separates the high molecular weight fraction into three components. The first component comprises amino acids, the second component comprises neutral compounds, probably monosaccharides, and the third component comprises organic acids. The low molecular weight fraction is similar to the organic acids component of the high molecular weight fraction.

The following examples illustrate the present invention without, however, limiting the same thereto.

EXAMPLE I

Six runs were made in each of which 50.0 grams of spend grounds were placed in 500 ml. of water and extracted with ammonium hydroxide for 1 hour at the concentration and temperature shown for each run. The yield of soluble solids is expressed as percent by weight.

| Run | Concentration | Temperature | Yield |
| --- | --- | --- | --- |
| 1 | 0.0007 N | 50° C. | 1% |
| 2 | 0.0007 N | 85° C. | 1% |
| 3 | 0.07 N | 50° C. | 2% |
| 4 | 0.07 N | 85° C. | 11% |
| 5 | 2.0 N | ca. 100° C. | 12% |
| 6 | Saturated* | ca. 100° C. | 12% |

*Saturation maintained with gaseous ammonia.

EXAMPLE II

Six runs were made in each of which 50 grams of defatted spent grounds were added to 500 ml. of water and extracted with sodium hydroxide at 100° C at the concentration and time shown for each run. The yield of soluble solids is expressed as percent by weight.

| RUN | CONC. NaOH | TIME | YIELD |
| --- | --- | --- | --- |
| 1 | 1 gram | 1 hr. | 6% |
| 2 | 2 grams | 1 hr. | 9% |
| 3 | 5 grams | 1 hr. | 24% |
| 4 | 10 grams | 1 hr. | 34% |
| 5 | 20 grams | 1 hr. | 44% |
| 6 | 5 grams | 1.5 hr. | 31% |

EXAMPLE III

The following runs show the effect of temperature and time upon the solubilization of defatted spent coffee grounds. Each run used 50 grams of spent grounds in 500 ml. of water. Yield is expressed as percent by weight.

| Run | g. KOH | Extraction Time | Temperature °C. | Yield |
| --- | --- | --- | --- | --- |
| 1 | 1 | 15 | 165 | 7 |
| 2 | 1 | 15 | 200 | 8 |
| 3 | 1 | 15 | 275 | 17 |
| 4 | 1 | 60 | 165 | 7 |
| 5 | 1 | 60 | 200 | 15 |
| 6 | 1 | 60 | 275 | 12 |
| 7 | 5 | 15 | 165 | 19 |
| 8 | 5 | 15 | 200 | 27 |
| 9 | 5 | 15 | 275 | 23 |
| 10 | 5 | 60 | 165 | 24 |
| 11 | 5 | 60 | 200 | 22 |
| 12 | 5 | 60 | 275 | 23 |
| 13 | 5 | 120 | 165 | 30 |
| 14 | 10 | 15 | 165 | 35 |
| 15 | 10 | 15 | 200 | 36 |
| 16 | 10 | 15 | 275 | 38 |
| 17 | 10 | 60 | 275 | 35 |

A most important effect of temperature is to degrade the soluble material into fragments. The degree of fragmentation is critically dependent upon temperature. At temperatures greater than approximately 200° C., the soluble extract is fragmented to such a degree that undesirable flavors and aromas are produced. A balance between maximum yield and minimum degeneration of the soluble product is achieved at temperatures in the range of from about 150° C. to about 180° C.

What is claimed is:

1. A method for treating spent coffee grounds in order to increase their yield comprising the steps of:
   a. obtaining spent coffee grounds from a soluble coffee process;
   b. contacting the spent grounds with an alkaline material, the contacting taking place in an aqueous medium at a temperature above about 85° C, at a concentration of alkaline material of at least about 0.025 N, and lasting at least about 10 minutes;
   c. treating the extract resulting from the alkaline treatment of the spent grounds in order to remove excess cations; and
   d. drying the treated extract to yield water soluble solids.

2. A method according to claim 1 wherein the alkaline material is selected from the group consisting of ammonia, the hydroxides, carbonates and bicarbonates of the alkali metals and alkaline earth metals, and mixtures thereof.

3. A method according to claim 1 wherein the water soluble solids are blended with soluble coffee solids obtained from said soluble coffee process.

4. A method according to claim 1 wherein the treated extract is added to the liquid extract obtained from said soluble coffee process before drying.

5. A method according to claim 1 wherein coffee flavor and aroma is added to said water soluble solids.

6. A method according to claim 1 wherein the spent grounds are sequentially contacted with a plurality of alkaline materials.

7. A method according to claim 6 wherein ammonia is one of the alkaline materials.

8. A method for producing soluble coffee, said method producing an increased yield of soluble solids and a darker soluble product comprising the steps of:

a. extracting roast and ground coffee with an alkaline ammonia material, the extraction taking place in an aqueous medium at a temperature above about 85° C. and at an ammonium ion concentration of at least about 0.025 N;
b. boiling and resulting aqueous extract to remove residual ammonium ions; and then
c. drying the aqueous extract.

* * * * *